Patented Feb. 3, 1925.

1,524,663

UNITED STATES PATENT OFFICE.

DONALD M. LIDDELL, OF ELIZABETH, NEW JERSEY.

PROCESS OF WATERPROOFING AND WATERPROOFED MATERIAL.

No Drawing.    Application filed June 30, 1920.    Serial No. 393,127.

*To all whom it may concern:*

Be it known that I, DONALD M. LIDDELL, a citizen of the United States, residing at Elizabeth, New Jersey, have invented certain new and useful Improvements in Processes of Waterproofing and Waterproofed Material, of which the following is a clear, full, and exact description.

My invention relates to a process of waterproofing building material and to a waterproofed material. My object is to improve and simplify the processes heretofore known in the prior art and to obtain a waterproofed construction which has a high water-repellant effect.

I have found by experiment that China wood oil (sometimes known as tung oil) or its metallic derivatives, commercially known as tung-oleates, are excellent waterproofing agents. These tung-oleates may be, and are, commercially formed with such metals as iron, lead, magnesium, calcium, or aluminum, and they or the China wood oil itself may be applied to building materials to give the water-repellant properties. They may be painted on, dissolved in proper solvents and sprayed on, or, especially in the case of the stuccos, mixed with the material during the process of manufacture, or as the material is mixed to make into blocks or tiles or to apply in the process of building.

Or in the case of China wood oil, it may even be absorbed by suitable media, such as kieselguhr, and the dry product later mixed with the stucco material. In the case of China wood oil itself being used, with some stucco materials, there seems to be a chemical reaction between the oil and the bases formed in the stucco, but the formation of such compounds is not essential to the successful working of the process.

As an example of my waterproofing, I have used the following proportions: calcined magnesite, ground 18 parts; asbestos 3 parts, manganese tung-oleate in powdered form 2 parts; sand 77 parts. The whole may be mixed together and the mass then set with sufficient magnesum chloride solution of 18 degrees Baumé strength to produce a mixture flowing freely under the trowel. This produces a magnesium oxychloride stucco variously known under this term or "plastic magnesite" and "Sorel stone," mixed with the metallic derivative of China wood oil. Or, a still more strongly water-repellant mixture may be formed by substituting one part of China wood oil for two parts of manganese tung-oleate. It has been found that when the waterproofing agent, such as China wood oil or its derivatives, are applied merely to the exterior surface of the shaped material to be waterproofed, the surface is quite materially darkened. When, however, the waterproofing material is integrally mixed with a stony building material previous to its being shaped, so small a quantity can be used that the darkening effect cannot be appreciated, while retaining the desired waterproofing quality at the surface.

I am aware that variations from the process and the particular steps of the process above pointed out, as well as from the particular materials and particular proportions mentioned, may be made without departing from the scope of my invention. I therefore do not desire to be limited to the particular steps or the particular materials, or the particular proportions above pointed out.

What I claim is—

1. The process of preparing a magnesium oxychloride stucco, which consists in mixing with the stucco, previously to its being shaped, manganese tung-oleate.

2. A magnesium oxychloride stucco waterproofed throughout with manganese tung-oleate.

Signed at New York, N. Y., this 29th day of June 1920.

DONALD M. LIDDELL.